US007633641B2

(12) United States Patent
Ishii (10) Patent No.: US 7,633,641 B2
(45) Date of Patent: Dec. 15, 2009

(54) IMAGE TRANSMISSION APPARATUS USING INFORMATION ON RENDERED RANGE

(75) Inventor: Eisaku Ishii, Tokyo (JP)

(73) Assignee: Nec ViewTechnology, Ltd., Tokyo (JP)

( * ) Notice: Subject to any disclaimer, the term of this patent is extended or adjusted under 35 U.S.C. 154(b) by 923 days.

(21) Appl. No.: 11/137,536

(22) Filed: May 26, 2005

(65) Prior Publication Data

US 2005/0264843 A1  Dec. 1, 2005

(30) Foreign Application Priority Data

May 27, 2004  (JP)  ............................. 2004-157897

(51) Int. Cl.
G06F 15/00 (2006.01)
G06F 15/16 (2006.01)
(52) U.S. Cl. ..................... 358/1.15; 709/203
(58) Field of Classification Search ................ 358/1.15, 358/1.13, 1.18, 1.16, 1.14; 348/153, 148, 348/744; 709/203, 250; 375/E7.019; 345/501; 386/113; 725/143
See application file for complete search history.

(56) References Cited

U.S. PATENT DOCUMENTS

| 2002/0196378 A1* | 12/2002 | Slobodin et al. ............ 348/744 |
| 2004/0125110 A1* | 7/2004 | Kohda et al. ................ 345/501 |

FOREIGN PATENT DOCUMENTS

| JP | 7-015609 | 1/1995 |
| JP | 7-123132 | 5/1995 |
| JP | 9-190392 | 7/1997 |
| JP | 10-074173 | 3/1998 |
| JP | 10-229558 | 8/1998 |
| JP | 2000-511364 | 8/2000 |
| JP | 2001-306059 | 11/2001 |
| JP | 2002-023719 | 1/2002 |
| JP | 2002-278526 | 9/2002 |
| JP | 2003-050694 | 2/2003 |

OTHER PUBLICATIONS

Japanese Office Action dated Mar. 12, 2008 with partial English Translation.
Chinese Office Action dated May 18, 2007 with English translation.

* cited by examiner

Primary Examiner—Saeid Ebrahimi Dehkordy
(74) Attorney, Agent, or Firm—McGinn IP Law Group, PLLC (57) ABSTRACT

An apparatus for transmitting image data through a network has an image rendering unit, an image processing device, a memory device, and an image transmitter. The image processing device is configured (a) to define a range surrounding an updated portion which has changed through displaying, of the displayed image sent from the image rendering unit, and to acquire position and range information of the defined range, (b) to compare the defined range with a range stored in the memory device, using the position and range information of the defined range and position and range information stored in the memory device, (c) to send the position and range information of the defined range to the memory device if there is no overlapping range between the compared ranges, and if there is an overlapping range between the compared ranges, to send position and range information of a new range surrounding the compared ranges to the memory device, and (d) when the image transmitter is ready for transmission through the network, to read image data of a latest image stored in the memory device, the image data corresponding to each item of the position and range information stored in the memory device at a time of transmission, to compress the image data in order to generate compressed image data, send the compressed image data to the memory device, and to initialize the position and range information stored in the memory device.

24 Claims, 6 Drawing Sheets

*First judgment*: R(i) contains Rin? [ (R(i) ⊇ Rin ]

*Second judgment*: Rin contains R(i)? [ Rin ⊃ R(i) ]

*Third judgment*: R(i) is adjacent to Rin?

Fig.3

*Fourth judgment*: f(Sin) + f(S(i)) + f(ΔS) ≥ f(S')?
where
Sin, S(i), and S' are areas of Rin, R(i), and R', respectively
f(S) is image compression time
ΔS is a value depending on the image compression process

*Fifth judgment*: S' ≤ Smin?
where
S' are the area of R'
Smin is a value depending on the image compression process

Fig.4

Fig.5

IMAGE TRANSMISSION APPARATUS USING INFORMATION ON RENDERED RANGE

BACKGROUND OF THE INVENTION

1. Field of the Invention

The present invention relates to an image transmission apparatus and an image transmission system, and, more particularly, to an image transmission apparatus and system which are capable of reducing the amount of image data to be transmitted during periods of congestion on the network connecting the data source and display terminal.

2. Description of the Related Art

In recent years, applications in which images are sent to display terminals have continued to increase in the art. In such an application, an image generated by a personal computer, for example, is sent via a wired or wireless network to a remote image display apparatus or terminal such as a projector or the like to be displayed thereby. Data generated by the personal computer are sent in the data format of a presentation software program to the remote image display terminal, which converts the data into image data and displays an image based on the image data.

Although the image may also be displayed on a display terminal directly associated with the personal computer generating the display data, the present invention specifically addresses the problem associated with the display on the remote display apparatus that is connected via the network. Moreover, there may not even be a local display terminal in an application configuration such as when a network server serves as the source of image data to be transmitted to the remote image display terminal.

According to such a process, the remote image display terminal needs to have a component such as a CD-ROM drive or the like for updating the presentation software program when an upgraded version is released. However, the additional component makes it difficult to meet requirements for smaller and less expensive image display terminals.

One solution is that the personal computer (which typically incorporates a CD-ROM drive) converts the data into image data and sends the image data to the image display terminal. However, it takes several seconds to transmit the image data through an ordinary network to the remote image display terminal, because the amount of image data is generally quite large.

There has been disclosed a process for shortening the transmission time of such image data by dividing the image data into blocks of bit map data. If the number of colors of the bit map data is small, then the number of indices is reduced, the bit map data are converted into indices with fewer bits, and the index data are compressed and sent. See Japanese Patent Laid-open Publication No. 74173/98 for details.

According to another disclosed system, image data are divided into blocks. Then portions of an image that have changed are detected in order to be displayed, and only image data which correspond to the blocks in which the change was detected are sent to update the displayed image, thereby reducing the amount of transmitted data. See Japanese Patent Laid-open Publication No. 50694/2003 for details.

However, with the systems disclosed above, it was difficult to control the amount of transmitted image data such that transmission delay was reduced between an image transmission apparatus and an image reception apparatus, depending on the transmission capability of a network. To control the amount of image data to be transmitted to reduce transmission delay, it was necessary to compress the image data at a high compression ratio in order to reduce the amount of image data to be transmitted, which lowers the quality of the displayed image.

However, if the image data were to be continuously compressed at a compression ratio to reduce transmission delay, the network bandwidth was not effectively used, and the quality of displayed images was degraded.

When an image to be displayed was frequently changed, in part or entirely, the conventional image transmission apparatus had to send image data for an entire image each time the image was changed, and hence needed to send a greatly increased amount of image data. Even if the amount of image data to be transmitted was reduced by a general image compression process, when image data were sent in an amount exceeding the transmission capability of the network, the transmission delay of received image data increased.

Under such a network, if the amount of image data to be transmitted was reduced by a high compression process to match the network bandwidth in order to improve the response time for displaying received image data, then the quality of displayed images was greatly degraded.

SUMMARY OF THE INVENTION

It is an exemplary feature of the present invention to provide an image transmission apparatus and an image transmission system which are capable of controlling an amount of image data to be transmitted through a network, using a simple process, depending on the current available bandwidth of the network.

In an exemplary embodiment of the present invention, an image transmission apparatus for transmitting image data through a network is provided. The apparatus has an image rendering unit, an image processing device, a memory device, and an image transmitter.

The image rendering unit is configured to convert, generate, or otherwise process for transmission on the network, data to display an image and send the display image data to the image processing device and the memory device.

The image processing device is configured (a) to define a range surrounding any of an updated portion of image data, which has changed through the processing for displaying, of the rendered image sent from the image rendering unit, and to acquire position and range information of the defined range, (b) to compare the defined range with a stored range in the memory device, by means of the position and range information of the defined range and position and range information stored in the memory device, (c) to send the position and range information of the defined range to the memory device if there is no overlapping range between the compared ranges, and if there is an overlapping range between the compared ranges, to send position and range information of a new range surrounding the compared ranges to the memory device, and (d) when the image transmitter is ready for transmission through the network, to read image data of a latest image stored in the memory device, the image data corresponding to each item of the position and range information stored in the memory device at one time of transmission, to compress the image data to generate compressed image data, send the compressed image data to the memory device, and to clear out the position and range information stored in the memory device.

The memory device is configured to store the image data output from the rendering unit, the position and range information sent from the image processing device, and the compressed image data.

The image transmitter is configured to transmit the compressed image data with each item of the associated position and range information.

When a network is congested, image data that are to be transmitted are not generated for an entire image by the image rendering unit, and information on ranges of image data which were updated is accumulated instead. When the apparatus is ready for transmission, portions of the image corresponding to the accumulated items of information of the updated ranges are read, and are transmitted as image data. According to a first advantage of the present invention, therefore, the amount of image data to be transmitted can be controlled by a simple process depending on the size of the currently-available bandwidth of the network.

The maximum amount of image data to be transmitted when the apparatus is ready for transmission corresponds to a maximum range that can be stored in the rendered range set, i.e., a whole image. Therefore, delay of image transmission, which is a time lag between the time the image is displayed on the image transmission apparatus and the time the image is displayed on the image reception apparatus, does not exceed the sum of processing time for compressing a whole image, processing time for expanding the whole image, and time for transmission. According to a second advantage of the present invention, therefore, the delay of image transmission can be reduced.

Moreover, the amount of image data to be compressed can be reduced before starting the compressing process, which compressing process typically places a large burden on a CPU (Central Processing Unit). This allows the CPU to avoid performing the image compressing process on those portions of the image which have not changed, in correspondence to a degree that matches the currently-available bandwidth of the network. According to a third advantage of the present invention, therefore, the burden on a CPU which is posed in an image processing process in an image transmission apparatus can be reduced.

The amount of image data transmitted to the image reception apparatus can also be reduced when the transmission rate is limited by the communication flow control process that is generally used in an image reception apparatus, because only the areas to be newly-displayed are accumulated in the image transmission apparatus for the next image transmission. According to a fourth advantage of the present invention, therefore, the amount of image data transmitted to the image reception apparatus can be controlled in the same manner as in the case of narrow network bandwidth, depending on the image display processing capability of the image reception apparatus.

According to a fifth advantage of the present invention, because, in an exemplary preferred embodiment, the updated areas are defined as rectangular ranges, a range which is newly input and a range which was already stored from the previous image data can be easily compared with each other, and any overlapping portion between those areas can be easily processed as well.

The above and other exemplary purposes, features, and advantages of the present invention will become apparent from the following description with reference to the accompanying drawings which illustrate non-limiting examples of the present invention.

DESCRIPTION OF EXEMPARY EMBODIMENTS OF THE PRESENT INVENTION

In an image transmission system according to a first exemplary embodiment of the present invention, when a network is congested and no image can be transmitted through the network, information on only the areas of an image that were updated during the congested state is stored in an image transmission apparatus.

When transmission then begins again, only the portions of the image corresponding to the updated ranges are read, and, in an exemplary embodiment, the image data thereof are then also compressed for this next transmission. That is, it is not necessary to send portions of the image that have not changed or each change made at each of any intermediate stages before the final change. The amount of image data to be transmitted can thus be reduced, depending on the current transmission capability of the network.

Moreover, in applications in which an image which frequently changes with user's operations is transmitted, it is often useful for the user to reduce transmission delay by omitting transmission of each change made at each of the intermediate stages before the final change, rather than to increase transmission delay by faithfully transmitting image data which were updated.

In general, according to the present invention, frequently changing image data displayed by an image transmission apparatus are partly omitted, depending on the current transmission capability of the network, thereby reducing transmission delay between source image data and received image data and improving the response time in which an image can be displayed based on the received image data.

The exemplary image transmission apparatus and system according to the present invention can be used in applications for sending images displayed on an image transmission apparatus through a wired or wireless network to an image display apparatus such as a projector or the like for being displayed thereby. The image transmission apparatus and system are also applicable to control a plurality of computers connected to each other by a network.

An image transmission system according to a first embodiment of the present invention will be described below with reference to FIGS. 1 through 4.

Figure 1:
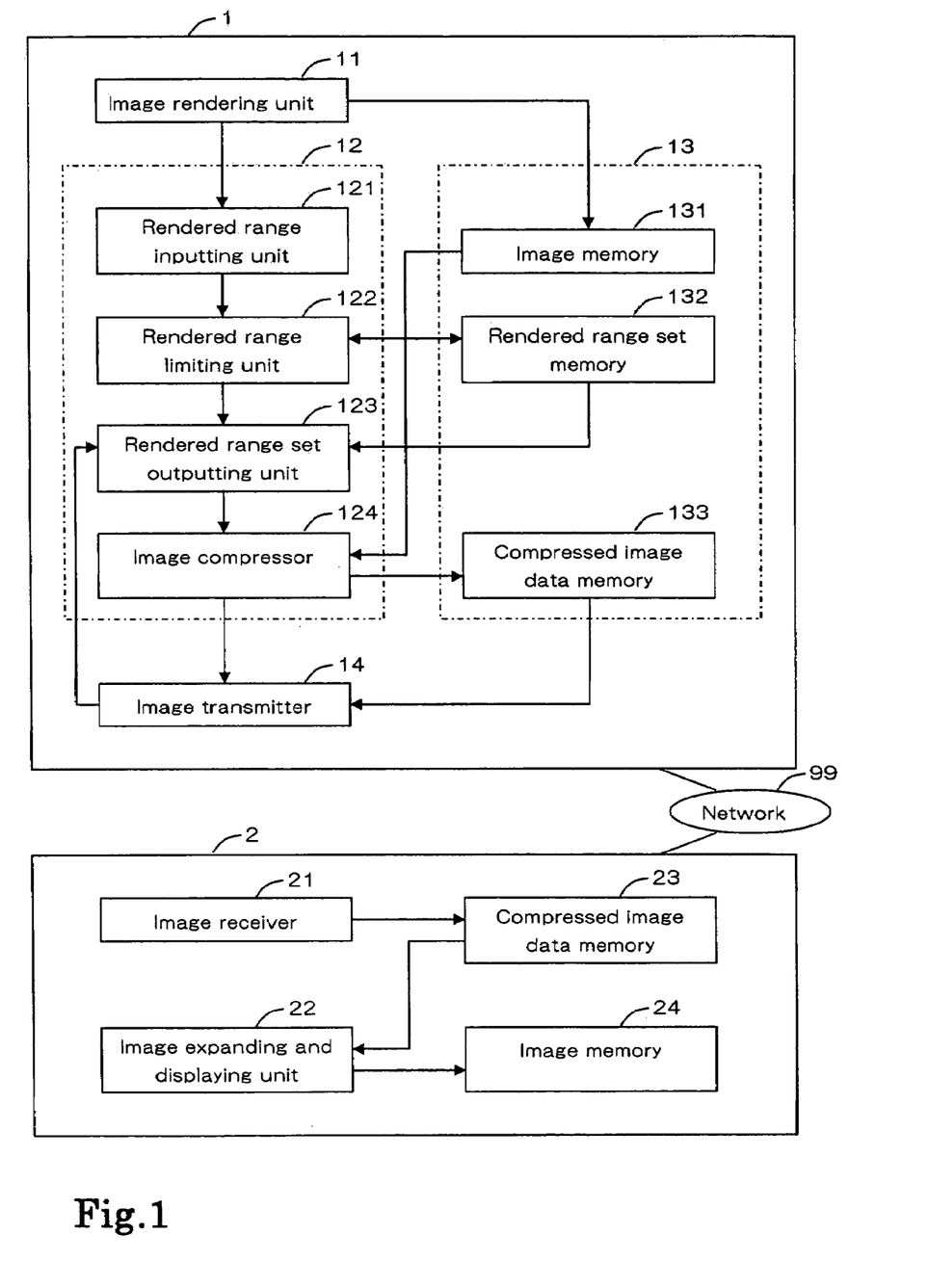
FIG. 1 is a block diagram of an image transmission system according to a first exemplary embodiment of the present invention.

FIG. 1 shows in block form the image transmission system according to the first embodiment of the present invention. As shown in FIG. 1, the image transmission system comprises image transmission apparatus 1, e.g., a computer perhaps having a local display that is not shown, and a remote image reception apparatus 2, e.g., an image display apparatus such as a projector or the like. Image transmission apparatus 1 and image reception apparatus 2 are connected to each other by network 99.

Image transmission apparatus 1 has image rendering unit 11, image processing device 12, memory device 13, and image transmitter 14. Image processing device 12 has rendered range inputting unit 121, rendered range limiting unit 122, rendered range set outputting unit 123, and image compressor 124. Memory device 13 has image memory 131, rendered range set memory 132, and compressed image data memory 133.

Image rendering unit 11 inputs an image that is to be newly displayed on the remote display 2 into image memory 131 and into rendered range inputting unit 121.

Rendered range inputting unit 121 defines a rectangular range which surrounds any portion of data that has changed, based on comparing the image input from image rendering unit 11 with the image of the previous image, and inputs the defined rectangular range to rendered range limiting unit 122. In the present embodiment, a rectangular range is used. However, ranges in a variety of shapes may be used insofar as they surround the input portion. Since a display is usually of an elongate rectangular shape, a rectangular range allows the entire display area to be processed as an updated portion, and also allows position and range information to be easily defined.

Rendered range limiting unit 122 compares the rectangular range received from rendered range inputting unit 121 with each of the rectangular ranges that are stored in and read from rendered range set memory 132. If the received rectangular range does not overlap with the stored rectangular range, then rendered range limiting unit 122 writes position and range information of the received rectangular range into rendered range set memory 132. If the received rectangular range overlaps with a stored rectangular range, then rendered range limiting unit 122 generates a new rectangular range which surrounds both the stored and received ranges and writes position and range information of the new rectangular range into rendered range set memory 132.

When rendered range set outputting unit 123 is notified that image transmitter 14 is ready for transmission, rendered range set outputting unit 123 reads information of a rectangular range set, i.e., one or more rectangular ranges, stored in rendered range set memory 132, and transfers the information to image compressor 124. Simultaneously, rendered range set outputting unit 123 clears out the information of the rectangular range set stored in rendered range set memory 132.

Based on the input information of the rectangular range set, image compressor 124 reads portions of the image corresponding to the respective rectangular ranges from image memory 131, compresses image data thereof, and writes the compressed image data, together with the position and range information, such as size, of the respective rectangular ranges, into compressed image data memory 133. Image compressor 124 also requests image transmitter 14 to transmit the compressed image data.

Image memory 131 stores a present image that is being prepared by image rendering unit 11. Rendered range set memory 132 stores the areas of this image that are updated after a previous rectangular range set has been transmitted. The areas are stored as a set of position and range information of the rectangular ranges. Compressed image data memory 133 stores therein the image data compressed by image compressor 124, together with the position and range information of respective rectangular ranges thereof.

Image transmitter 14 transmits the compressed image data stored in compressed image data memory 133, together with the position and range information of respective rectangular ranges thereof, through network 99 to image reception apparatus 2. When the transmission of the compressed image data is completed, image transmitter 14 sends information to rendered range set outputting unit 123 indicating that the compressed image data were transmitted. It is noted that the level of congestion on the network can be determined by whether data compression has been requested. If no compression is requested, then the image transmission apparatus 1 can recognize that congestion is low and can return to a transmission mode in which uncompressed data of a complete image is transmitted, rather than the compressed portions of changed data of the rectangular ranges.

When image transmitter 14 subsequently receives a new request to transmit compressed image data from image compressor 124, image transmitter 14 transmits compressed image data again. As long as image transmitter 14 is transmitting compressed image data to network 99 or while network 99 is congested and the transmission capability is lowered, then updated portions in the image which were updated by image rendering unit 11 will be stored in rendered range set memory 132 as position and range information of a rectangular range set.

Image reception apparatus 2 has image receiver 21, image expanding and displaying unit 22, compressed image data memory 23, and image memory 24. Image receiver 21 receives compressed image data from image transmission apparatus 1 through network 99, and writes the received compressed image data into compressed image data memory 23. Image expanding and displaying unit 22 reads the compressed image data from compressed image data memory 23, expands the compressed image data into displayable image data, and writes the displayable image data into image memory 24 based on the position and range information of the rectangular ranges. In this way, an image is displayed on a display screen (not shown) based on the received image data, as appropriately fitted into the unchanged image portions outside the rectangular ranges that define changed image data.

As described above, rendered range limiting unit 122 of image transmission apparatus 1 defines the ranges which were updated after the previous image had been transmitted, and only portions corresponding to the defined ranges are compressed and transmitted to image reception apparatus 2. This allows for the generation and transmission of data that matches the image compressing means and the network bandwidth. Furthermore, delay in transmission of an image is reduced, and the response time of a received image is improved.

Figure 2A:
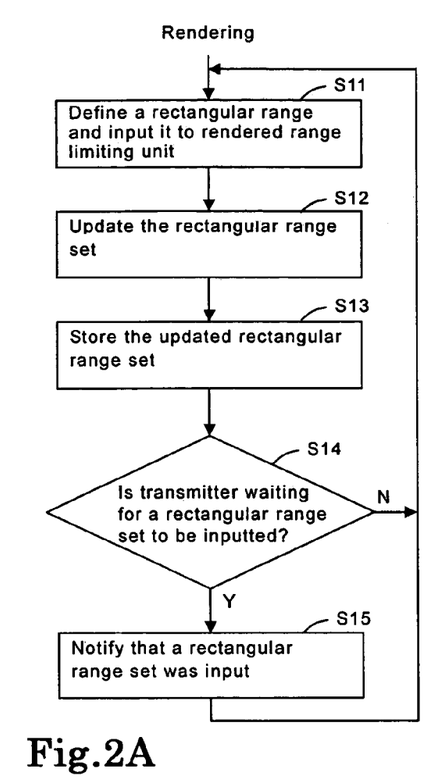
FIGS. 2A through 2C are flowcharts of operation sequences of the image transmission system according to the first exemplary embodiment, FIG. 2A showing an operation sequence of a rendered range inputting unit and a rendered range limiting unit, FIG. 2B an operation sequence of a rendered range set outputting unit and an image compressor, and FIG. 2C an operation sequence of an image transmitter.
Figure 2B:
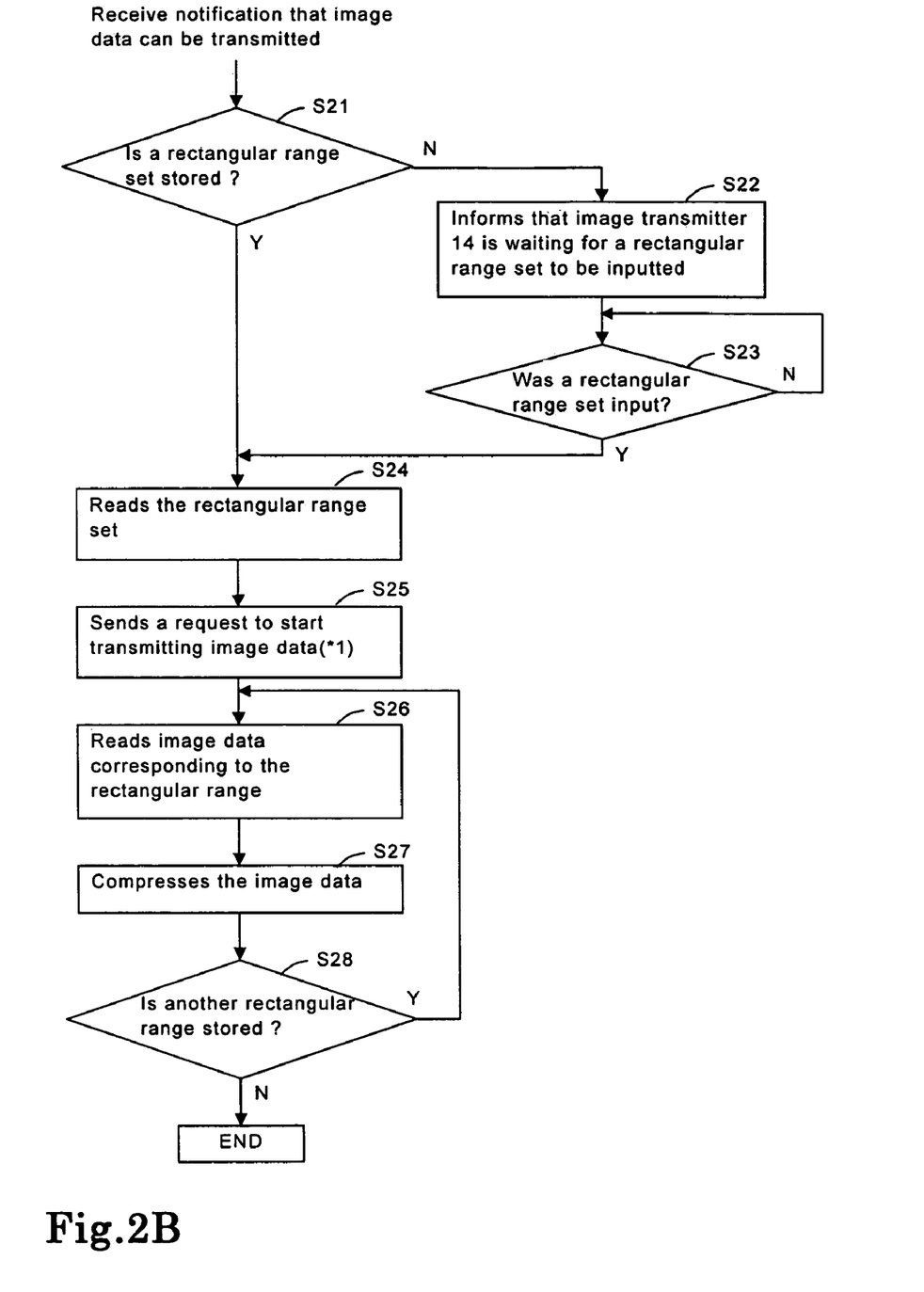
Figure 2C:
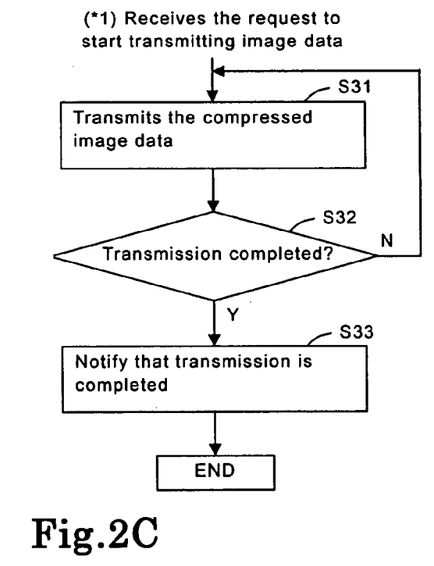

Operation of the image transmission system according to the exemplary first embodiment of the present invention will be described below with reference to the block diagram of FIG. 1 and the flowcharts of FIGS. 2A through 2C. FIGS. 2A through 2C are flowcharts of operation sequences of the image transmission system according to the exemplary first embodiment.

FIG. 2A shows an operation sequence of rendered range inputting unit 121 and rendered range limiting unit 122, FIG. 2B shows an operation sequence of rendered range set outputting unit 123 and image compressor 124, and FIG. 2C shows an operation sequence of image transmitter 14. The operation sequences shown in FIGS. 2A through 2C are performed in parallel and independently of each other.

Image rendering unit 11 of image transmission apparatus 1 stores an image to be displayed on the display into image memory 131 and inputs the displayed image to rendered range inputting unit 121. Rendered range inputting unit 121 defines the range of the updated portion as a rectangular range surrounding the updated portion, and inputs the defined rectangular range to rendered range limiting unit 122 (Step S11). Rendered range limiting unit 122 reads rectangular ranges from the rectangular range set that are stored, but not yet transmitted, in rendered range set memory 132, and compares each of them with the defined rectangular range.

If the defined rectangular range overlaps with any of the rectangular ranges read from rendered range set memory 132, then rendered range limiting unit 122 generates a rectangular range surrounding both the ranges, updates the rectangular range set (Step S12), and stores the updated rectangular range set into rendered range set memory 132 (Step S13).

Rendered range limiting unit 122 checks whether rendered range set outputting unit 123 has been notified that image transmitter 14 is ready for transmission and whether image transmitter 14 is waiting for a rectangular range set to be input (Step S14). If rendered range set outputting unit 123 has been notified (Step S14 (Y)), then rendered range limiting unit 122 informs rendered range set outputting unit 123 that a rectangular range set was input (Step S15). Then, control goes back to step S11.

If rendered range set outputting unit 123 has not been notified (Step S14 (N)), control goes back to step S11. Rendered range inputting unit 121 and rendered range limiting unit 122 repeat steps S11 through S15.

If rendered range set outputting unit 123 has been notified that image transmitter 14 is ready for transmission, i.e., the network is idling, and image transmitter 14 is waiting for a rectangular range set to be input, then rendered range set outputting unit 123 checks whether a rectangular range set will be stored in rendered range set memory 132 (Step S21). If no updated image was displayed after the previous rectangular range set had been transmitted (Step S21 (N)), then a rectangular range set is not stored in rendered range set memory 132. In this case, rendered range set outputting unit 123 informs rendered range limiting unit 122 that image transmitter 14 is still waiting for a rectangular range to be input (Step S22), and waits until a new rectangular range is input from rendered range limiting unit 122 (Step S23 (N)). If a new rectangular range was input (Step S23 (Y)), then control goes to step S24.

If a rectangular range set has been stored in rendered range set memory 132 (Step S21 (Y)), or a new rectangular range was input (Step S23 (Y)), rendered range set outputting unit 123 reads the rectangular range set from rendered range set memory 132, and sends the rectangular range set to image compressor 124. Image compressor 124 sends a request to start transmitting image data to image transmitter 14 (Step S25). Image compressor 124 reads image data corresponding to the rectangular ranges (Step S26), compresses this image data and writes the compressed image data into compressed image data memory 133 (Step S27). Image compressor 124 repeats the compressing process until all the image data corresponding to the rectangular range set have been compressed (Step S28).

When image transmitter 14 receives the request to start transmitting image data from image compressor 124, image transmitter 14 reads the compressed image data from compressed image data memory 133. Image transmitter 14 then continuously transmits the compressed image data to image reception apparatus 2 through network 99 until all the compressed image data have been transmitted (Step S31 and step S32 (N)). When the transmission of all the compressed image data has been completed (Step S32 (Y)), image transmitter 14 informs rendered range set outputting unit 123 that the transmission of all the compressed image data has been completed (Step S33).

Image receiver 21 of image reception apparatus 2 receives the compressed image data from image transmission apparatus 1 through network 99, and writes the received compressed image data into compressed image data memory 23. Image expanding and displaying unit 22 reads the compressed image data from compressed image data memory 23, and expands the compressed image data into displayable image data. Image expanding and displaying unit 22 writes the expanded image data into image memory 24 based on the position and range information of the rectangular ranges. In this way, during periods of network congestion, an image is displayed on the remote display screen based on the image data as being one or more rectangular ranges containing changed data fitted into non-changed background data.

Figure 3:
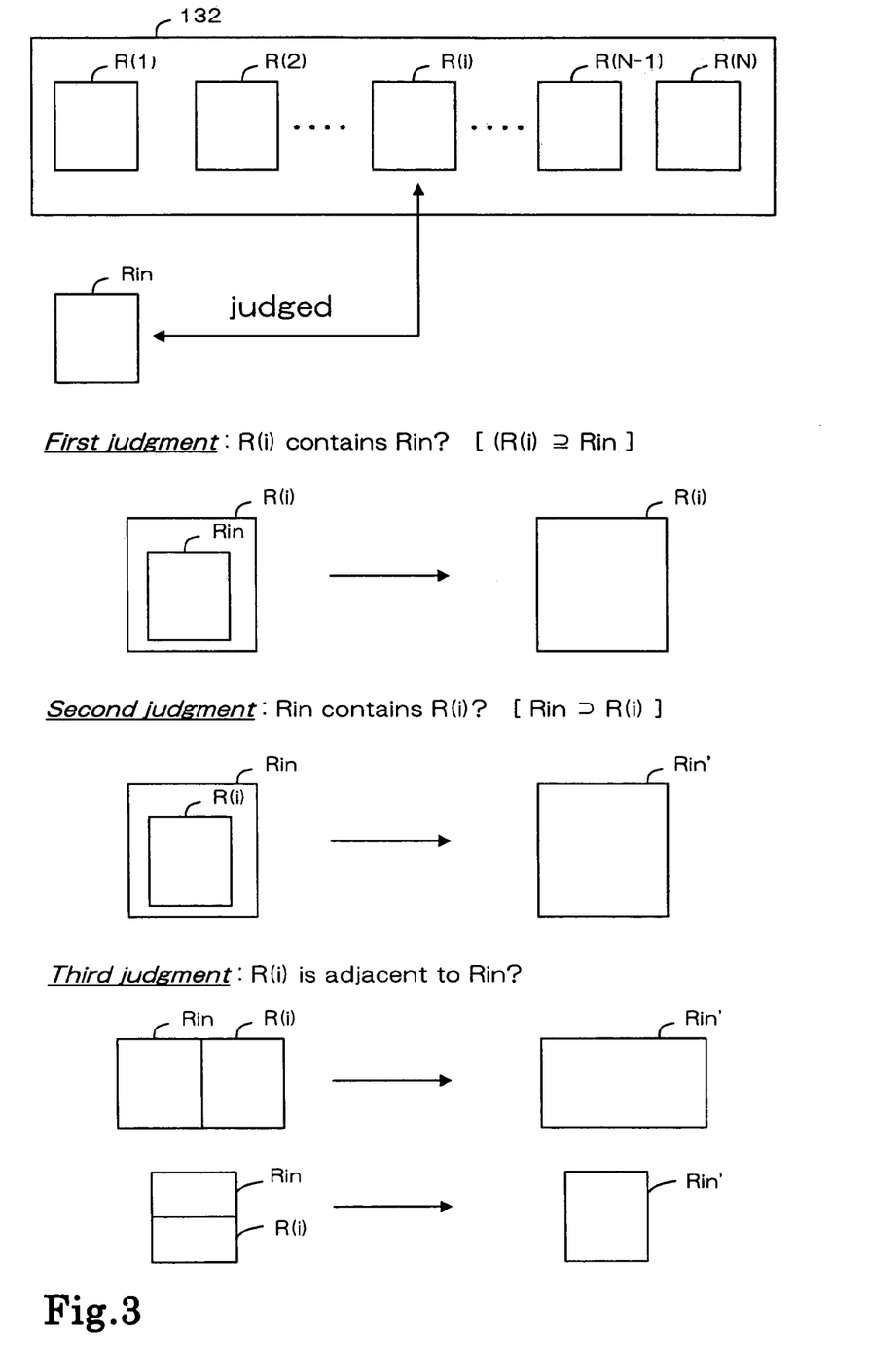
FIGS. 3 and 4 are diagrams illustrative of a process for combining and storing rectangular ranges, FIG. 3 showing combination judgment processes up to the third combination judgment process, and FIG. 4 showing from the fourth to the fifth combination judgment process.
Figure 4:
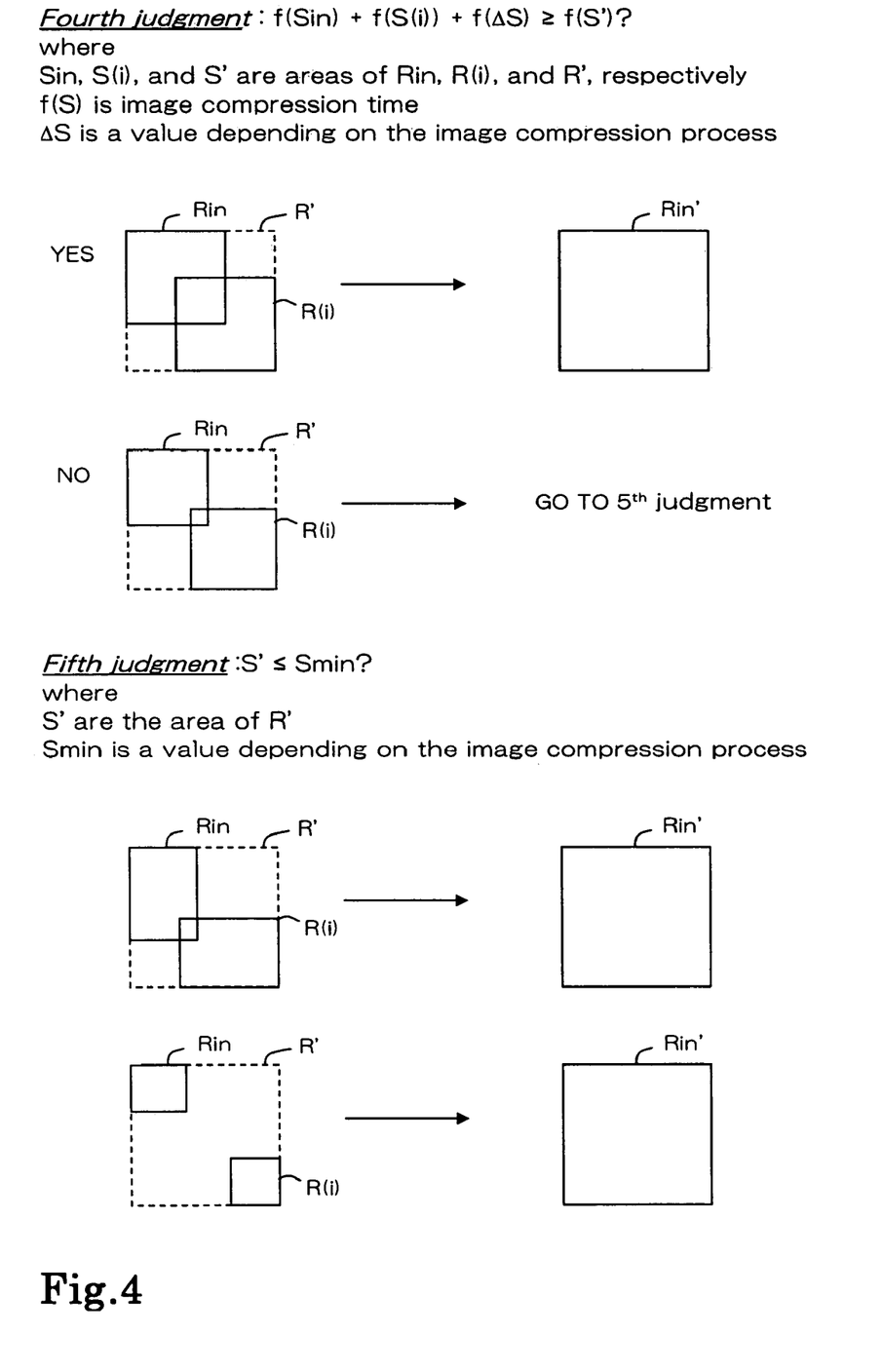

A process of combining and storing the rectangular ranges which is performed by rendered range limiting unit 122 and rendered range set storing unit 132 will be described in detail below with reference to FIGS. 3 and 4. FIGS. 3 and 4 are illustrative of the process of storing and combining rectangular ranges. FIG. 3 shows combination judgment processes up to the third combination judgment process, and FIG. 4 shows combination judgment processes from the fourth combination judgment process to the fifth combination judgment process.

Rendered range set memory 132 stores therein ranges of an image which were newly displayed after the previous rectangular range set had been transmitted, as a rectangular range set R(1), R(2), ..., R(i), ..., R(N-1), R(N). In an exemplary embodiment, the updated rectangular ranges are sequentially arranged in vertical and horizontal directions in an X-Y coordinate system using the upper left point of each rectangular range as a reference point. Therefore, when the whole rectangular range set is read and transmitted at one time, the portions that have changed are sequentially displayed from the upper to the lower direction on the display by image reception apparatus 2.

Rendered range limiting unit 122 performs a process for updating a rectangular range set based on rectangular range Rin input from rendered range inputting unit 121 and element R(i) of the rectangular range set that is read from rendered range set memory 132, through the first to fifth combination judgment processes shown in FIGS. 3 and 4.

First, rendered range limiting unit 122 checks whether any one of elements R(1)-R(N) of the rectangular range set surrounds rectangular range Rin input from rendered range inputting unit 121. If this condition is satisfied, it means that the rectangular range set stored in rendered range set memory 132 already surrounds rectangular range Rin. In this case, the rectangular range set stored in rendered range set memory 132 is not updated, and the combination judgment process is finished. If this condition is not satisfied, rendered range limiting unit 122 performs the second combination judgment process.

In the second combination judgment process, rendered range limiting unit 122 checks whether rectangular range Rin input from rendered range inputting unit 121 surrounds any one or any ones of elements R(1)-R(N) of the rectangular range set. If this condition is satisfied, then the surrounded element R(i) is removed from the rectangular range set, and rectangular range Rin is added as new rectangular range Rin'. Since it is possible that more than one element of the rectangular range set may be surrounded in rectangular range Rin, rendered range limiting unit 122 performs the above check on all elements R(1) through R(N).

In the third combination judgment process, rendered range limiting unit 122 checks whether rectangular range Rin input from rendered range inputting unit 121 is adjacent to any one of elements R(1)-R(N) of the rectangular range set. Priority is given to horizontal adjacency rather than vertical adjacency in order to join rectangular ranges in the upper-to-lower direction of the display screen. If this condition is satisfied, rendered range limiting unit 122 combines rectangular range Rin and adjacent element R(i) into rectangular range Rin', and removes element R(i) from the rectangular range set. Rectangular range Rin' is added as new rectangular range Rin, and the process goes back to the second combination judgment process. If this condition is not satisfied, rendered range limiting unit 122 performs the fourth combination judgment process.

In the fourth combination judgment process, rendered range limiting unit 122 determines the minimum rectangular range R' that surrounds both rectangular range Rin input from rendered range inputting unit 121 and element R(i) of the rectangular range set. If the relationship:

$$f(\text{Sin}) + f(S(i)) + f(\Delta S) \geq f(S')$$

where Sin, S(i), and S' represent the areas of rectangular range Rin, element R(i), and minimum rectangular range R', respectively, f(S) represents image compression time, and ΔS represents a value depending on the image compression process, is satisfied, then rendered range limiting unit 122 combines rectangular range Rin and element R(i) into rectangular range Rin', and removes element R(i) from the rectangular range set. Rectangular range Rin' is added as new rectangular range Rin, and the process goes back to the second combination judgment process. If this condition is not satisfied, rendered range limiting unit 122 performs the fifth combination judgment process.

Since image compression time generally increases depending on the area (the number of pixels), the following relationship may be used for a judgment basis:

$$f(\text{Sin}) + f(S(i)) \geq f(S')$$

However, by calculating the value f(ΔS) from the following equation, and taking it into account, image compression time can be estimated more precisely and compression efficiency can be enhanced.

$$f(\text{Sin}) + f(S(i)) = f(S'')$$

$$f(S'') - f(S') = f(\Delta S)$$

In the fifth combination judgment process, rendered range limiting unit 122 determines the minimum rectangular range R' that surrounds rectangular range Rin input from rendered range inputting unit 121 and element R(i) of the rectangular range set. If S'≦Smin, where S' represents the area of rectangular range R' and Smin represents a value depending on the image compression process, is satisfied, then rendered range limiting unit 122 combines rectangular range Rin and element R(i) into rectangular range Rin', and removes element R(i) from the rectangular range set. Smin is an area in which the relationship Tmin=f(Smin), where T=f(s) is image compression time, is satisfied. In the image compression process, there generally exists a threshold value Smin. Rectangular range Rin' is added as new rectangular range Rin, and the judgment process goes back to the second combination judgment process.

If none of the above five conditions are satisfied, rendered range limiting unit 122 adds rectangular range Rin as a new element to the rectangular range set.

Figure 5:
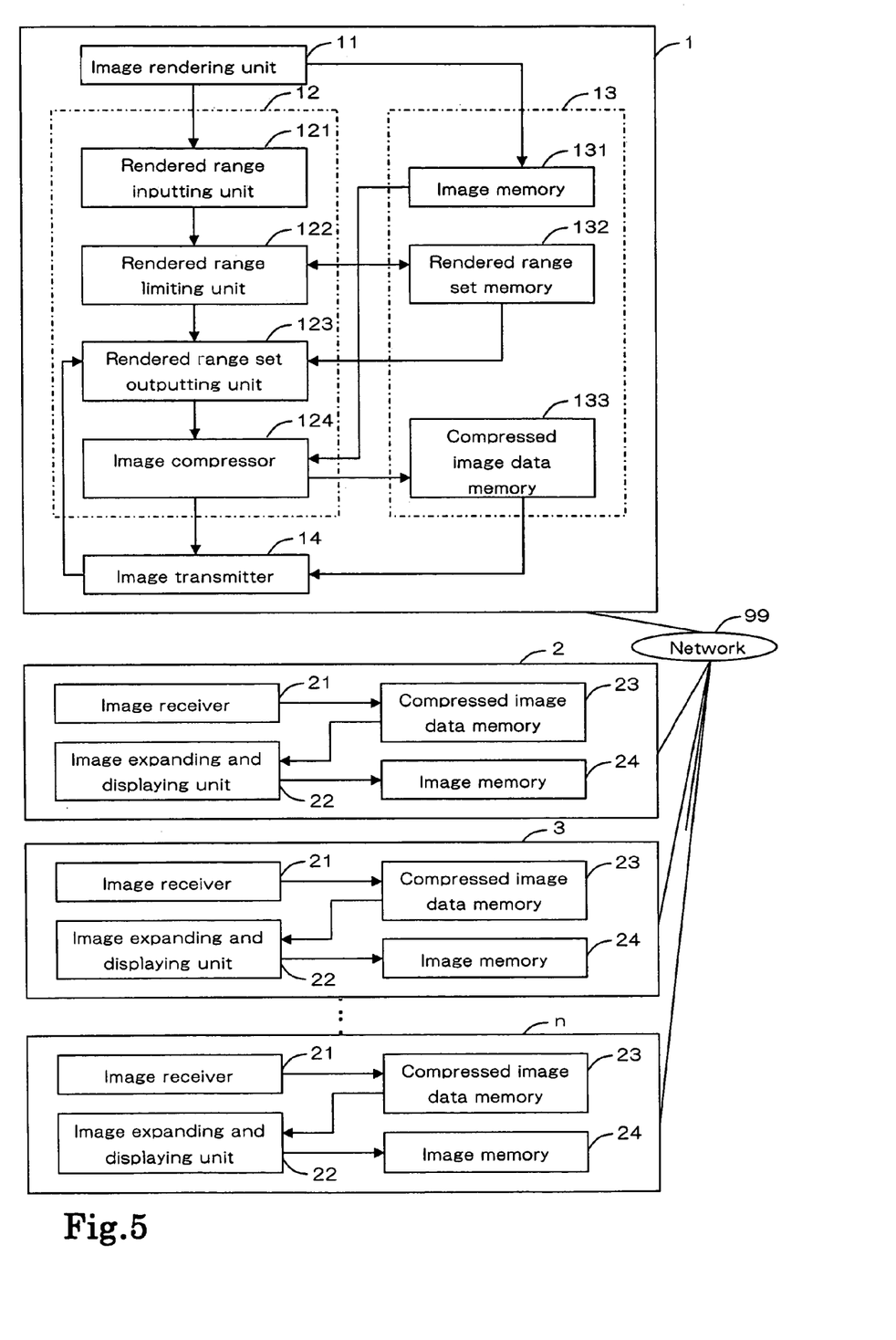
FIG. 5 is a block diagram of an image transmission system according to a second exemplary embodiment of the present invention.

An arrangement of an image transmission system according to a second exemplary embodiment of the present invention will be described in detail below with reference to FIG. 5. FIG. 5 shows in block form the image transmission system according to the second embodiment of the present invention.

The image transmission system according to the second exemplary embodiment differs from the first exemplary embodiment shown in FIG. 1 in that it has a plurality of image reception apparatuses, 3 through n, in addition to the arrangement of the image transmission system according to the first embodiment. Each of image reception apparatus 2 through n may be a projector or a combination of a computer and a display unit. Other structural and operational features of the image transmission system according to the second embodiment are identical to those of the image transmission system according to the first embodiment. Therefore, each element is denoted by identical reference numerals, and will not be described in detail.

As shown FIG. 5, image transmission apparatus 1 has image rendering unit 11, image processing device 12, memory device 13, and image transmitter 14. Image rendering unit 11, image processing device 12, and memory device 13 are of the same arrangement and perform the same processing as those of the image transmission system according to the first embodiment.

Image transmitter 14 sends compressed image data, which are generated by image processing device 12 and memory device 13, at one time to image reception apparatuses 2 through n via network 99. Because image data are transmitted at one time to a plurality of image reception apparatuses and each image reception apparatus may have a different processing capability, it is possible that the image transmission system according to the second embodiment may take more time to complete the transmission of image data than the image transmission system according to the first embodiment. However, the amount of image data to be transmitted can be reduced through the same operation as in the first embodiment.

Each of image reception apparatuses 2 through n performs the same processing as image reception apparatus 2 of the image transmission system according to the first embodiment.

Although certain exemplary embodiments of the present invention have been shown and described in detail, it should be understood that various changes and modifications may be made therein without departing from the spirit or scope of the appended claims.

What is claimed is:

1. A method used in an image transmission apparatus to transmit image data to an image reception apparatus via a network, comprising:
   receiving a range of a newly-displayed image area;
   accumulating range information according to said range of said newly-displayed image area;
   repeating the receiving a range of newly-displayed image area and accumulating range information until said image transmission apparatus is ready for transmission;
   compressing image data in areas corresponding to said range information; and
   transmitting the compressed image data when said image transmission apparatus is ready for the transmission,
   wherein said range information comprises a set of ranges, each element of which is capable to encompass two or more of a plurality of changed image areas, and
   wherein said image transmission apparatus becomes unready for transmission based on a congestion level of said network.

2. The method of claim 1, wherein said image transmission apparatus becomes unready based on an image display processing capability of said image reception apparatus.

3. The method of claim 1, wherein said newly-displayed image area and said plurality of changed image areas comprises a rectangle.

4. The method of claim 1, wherein accumulating range information comprises:
   in case that said range of said newly-displayed image area is encompassed by any element of said set of ranges, finishing accumulating range information without updating said range information.

5. The method of claim 1, wherein accumulating range information comprises:
   in case that said range of said newly-displayed image area encompasses any element of said set of ranges, removing said element from said range information and adding said range of said newly-displayed image area to said range information.

6. The method of claim 1, wherein accumulating range information comprises:
   in case that said range of said newly-displayed image area is adjacent to any element of said set of ranges, removing said element from said range information and adding a new range that encompasses both of said range of said newly-displayed image area and said element to said range information.

7. The method of claim 1, wherein accumulating range information comprises:
   in case that said range of said newly-displayed image area is horizontally adjacent to a first element of said set of ranges and vertically adjacent to a second element of said set of ranges, removing said first element from said range information and adding a new range that encompasses both of said range of said newly-displayed image area and said first element to said range information.

8. The method of claim 1, wherein accumulating range information comprises:
   in case that f(Sin)+f(S(i))+f(−S) is greater than or equal to f(S'), removing an element of said set of ranges from said range information and adding a new range that encompasses both of said range of said newly-displayed image area and said element to said range information,
   where f(Sin), f(S(i)), and f(S') represent image compression times for said newly-displayed image area, an area corresponding to said element, and an area corresponding to said new range, respectively, and f(−S) represents a predetermined image compression time.

9. The method of claim 1, wherein said image reception apparatus comprises a projector and said image transmission apparatus comprises a computer.

10. The method of claim 1, wherein, when said image transmission apparatus is unready, the compressed image data is not transmitted to said image transmission apparatus.

11. A computer-readable medium encoded with a computer program to be executed by a computer to transmit image data to an image reception apparatus via a network, said program comprising:
   receiving a range of a newly-displayed image area;
   accumulating range information according to said range of said newly-displayed image area;
   repeating receiving a range of newly-displayed image area and accumulating range information until said computer is ready for transmission;
   compressing image data in areas corresponding to said range information; and
   transmitting the compressed image data when said computer is ready for the transmission,
   wherein said range information comprises a set of ranges, each element of which is capable to encompass two or more of a plurality of changed image areas,
   wherein said computer becomes unready for transmission based on a congestion level of said network.

12. The computer-readable medium of claim 11, wherein said computer becomes unready for transmission based on an image display processing capability of said image reception apparatus.

13. The computer-readable medium of claim 11, wherein said newly-displayed image area and said plurality of changed image areas comprises a rectangle.

14. The computer-readable medium of claim 11, wherein accumulating range information comprises:
   in case that said range of said newly-displayed image area is encompassed by any element of said set of ranges, finishing accumulating range information without updating said range information.

15. The computer-readable medium of claim 11, wherein accumulating range information comprises:
   in case that said range of said newly-displayed image area encompasses any element of said set of ranges, removing said element from said range information and adding said range of said newly-displayed image area to said range information.

16. The computer-readable medium of claim 11, wherein accumulating range information comprises:
   in case that said range of said newly-displayed image area is adjacent to any element of said set of ranges, removing said element from said range information and adding a new range that encompasses both of said range of said newly-displayed image area and said element to said range information.

17. The computer-readable medium of claim 11, wherein accumulating range information comprises:
   in case that said range of said newly-displayed image area is horizontally adjacent to a first element of said set of ranges and vertically adjacent to a second element of said set of ranges, removing said first element from said range information and adding a new range that encompasses both of said range of said newly-displayed image area and said first element to said range information.

18. The computer-readable medium of claim 11, wherein accumulating range information comprises:
   in case that f(Sin)+f(S(i))+f(−S) is greater than or equal to f(S'), removing an element of said set of ranges from said range information and adding a new range that encompasses both of said range of said newly-displayed image area and said element to said range information,
   where f(Sin), f(S(i)), and f(S') represent image compression times for said newly-displayed image area, an area corresponding to said element, and an area corresponding to said new range, respectively, and f(−S) represents a predetermined image compression time.

19. The computer-readable medium of claim 11, wherein said image reception apparatus comprises a projector.

20. A projector system, comprising:
   the computer-readable medium of claim 11; and
   an image reception apparatus.

21. An image transmission apparatus, comprising:
   a rendered range limiting unit that accumulates range information according to a range of a newly-displayed image area;

a rendered range input unit that inputs said range of said newly-displayed image area to said rendered range limiting unit;

an image compressor that compresses image data in areas corresponding to said range information; and an image transmitter that transmits the compressed image data when said image transmission apparatus is ready for transmission, wherein said range information comprises a set of ranges, each element of which is capable to encompass two or more of a plurality of changed image areas, wherein said image transmission apparatus becomes unready for transmission based on a congestion level of said network.

22. The image transmission apparatus of claim 21, further comprising:

an image memory in which data for the changed images is stored;

a rendered range set memory in which said range information is stored; and an image rendering unit that renders the changed images by storing said data for the changed images in said image memory.

23. An image transmission system, comprising:
an image transmission apparatus of claim 21; and
an image reception apparatus.

24. An image transmission apparatus, comprising:

rendered range limiting means for accumulating range information according to a range of a newly-displayed image area;

rendered range input means for inputting said range of said newly-displayed image area to said rendered range limiting means;

image compression means for compressing image data in areas corresponding to said range information; and image transmission means for transmitting the compressed image data when said image transmission apparatus is ready for transmission, wherein said range information comprises a set of ranges, each element of which is capable to encompass two or more of a plurality of changed image areas, wherein said image transmission apparatus becomes unready for transmission based on a congestion level of said network.

* * * * *